April 7, 1959     D. L. HARSHMAN     2,880,579
AUTOMATIC BUZZ CONTROL
Filed June 29, 1953
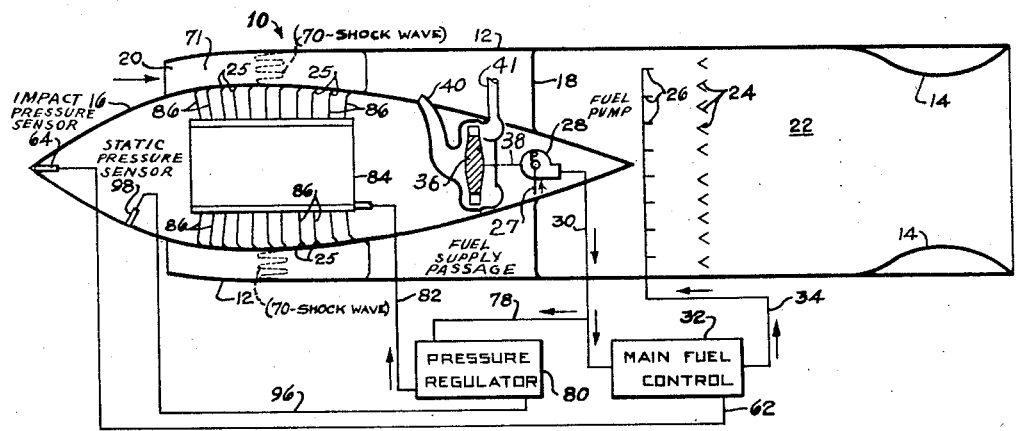
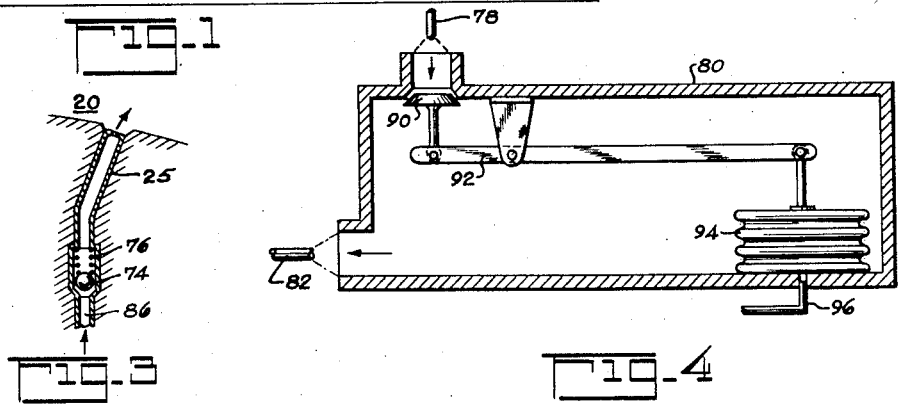
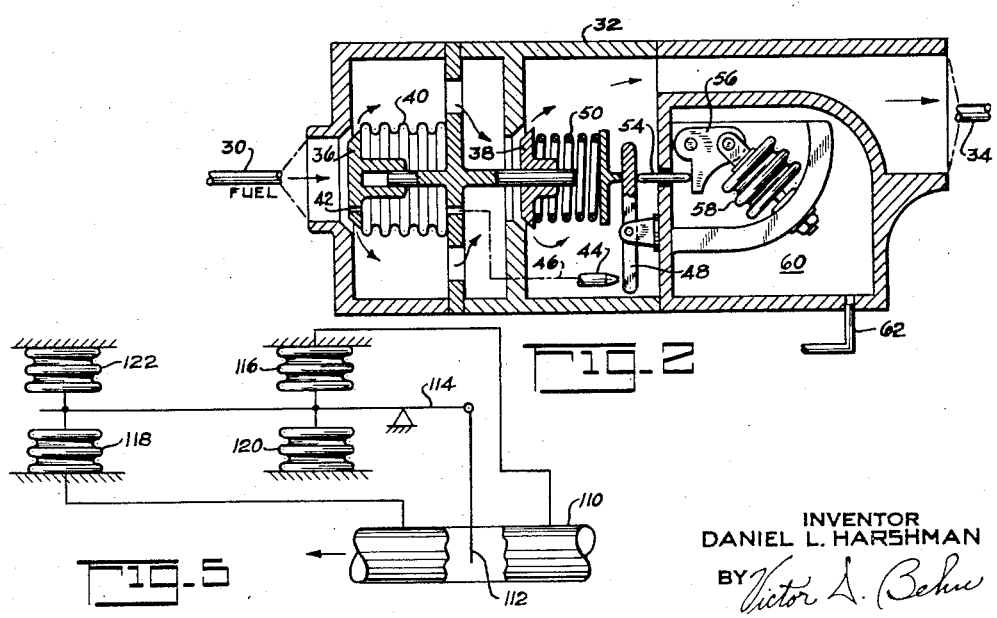
INVENTOR
DANIEL L. HARSHMAN
BY
ATTORNEY United States Patent Office 2,880,579
Patented Apr. 7, 1959

2,880,579

AUTOMATIC BUZZ CONTROL

Daniel L. Harshman, Lodi, N.J., assignor to Curtiss-Wright Corporation, a corporation of Delaware Application June 29, 1953, Serial No. 364,588

11 Claims. (Cl. 60—39.28)

This invention relates to jet engines and is particularly directed to a control system for jet engines which take in air from the surrounding atmosphere for combustion and are designed for supersonic flight.

The invention is primarily designed for use with ram-jet aircraft engines. A ram-jet engine comprises a duct-like structure having a forwardly directed air inlet at its forward end, a rearwardly directed exhaust nozzle at its aft end and a combustion chamber intermediate said ends. The thrust of a ram-jet engine increases with increase in the rate at which air enters the engine and the more efficiently said air is used the lower the specific fuel consumption (fuel consumption per unit thrust output) of the engine. Accordingly it is desirable that a ram-jet inlet operate at as high a conversion as possible of the velocity of the entering air to pressure, that is, at as high a pressure recovery as possible. At supersonic flight speeds air enters the ram-jet inlet at supersonic velocities and therefore a normal shock wave, that is the shock wave marking the transition from supersonic to subsonic flow, exists in the inlet. As is known, the static pressure downstream of the shock wave is substantially higher than the pressure upstream of said shock wave. Furthermore the position of said normal shock wave in the engine inlet depends on the magnitude of the pressure on its downstream side and this pressure in turn depends on the resistance to flow through the engine downstream of said shock wave. Thus any increase in the resistance to fluid flow through the engine downstream of the shock wave causes an increase in the pressure on the downstream side of the shock wave which in turn causes the shock wave to move to a more upstream position. Likewise any decrease in said flow resistance results in a decrease in the pressure donwstream of the shock wave whereupon the shock wave moves to a more downstream position. For stable operation of the engine air inlet, the inlet normal shock wave should be disposed at the inlet throat or downstream therefrom. If the inlet is operating at too high a pressure recovery, the high pressure downstream of the shock wave causes the shock wave to move upstream completely out of the inlet whereupon a portion of the air approaching the inlet spills out around the inlet. As a result of this air spillage the air flow into the engine decreases whereupon the pressure drops within the engine and the shock wave moves back into the inlet whereupon the pressure on the downstream side of the inlet normal shock wave again increases to said high value. Thus if the inlet of a ram-jet engine operates at too high a pressure recovery the position of the shock wave becomes unstable and oscillates rapidly back and forth into and out of the inlet. This type of aerodynamic instability of an engine air inlet is generally known as "buzz" and is highly undesirable because of the severe pressure fluctuations resulting from rapid oscillation of the shock wave. This phenomenon of buzz is not confined to ram-jet engines. Buzz may occur in any jet engine which takes in air at supersonic velocity.

An object of the present invention comprises the provision of a jet engine control system which permits operation of the engine at high inlet pressure recovery by automatically regulating the engine to prevent buzz.

As previously stated the static pressure on the downstream side of a shock wave is higher than the pressure on its upstream side and the actual position of the shock wave depends on the pressure on its downstream side whereby the position of the inlet normal shock wave can be determined by static pressure measurements in the inlet. A further object of the invention comprises the provision of a novel jet engine control system in which means are provided for regulating the engine to control the position of the air inlet shock wave in response to pressure changes in the air inlet.

For a given mass airflow through a jet engine, any increase in the rate of fuel supply to the combustion chamber, that is, increase in the fuel air ratio, increases the resistance to flow of the engine gases out therefrom thereby increasing the pressure within the engine downstream of the inlet shock wave. Likewise any decrease in said rate of fuel supply decreases the resistance to said flow thereby decreasing said pressure. Thus, at a given mass airflow any increase or decrease in the fuel supply to a ram jet engine causes the inlet shock wave to move in an upstream or downstream direction, respectively. A still further object of the invention comprises the provision of novel means for controlling the position of the air inlet shock wave of a jet engine by automatically regulating the engine fuel supply.

Still another object of the invention comprises the provision of novel means for automatically regulating the engine fuel supply in response to inlet pressure changes resulting from movements of the inlet shock wave so that movement of the shock wave in an upstream direction results in a decrease in the rate of fuel supply to the eng'ne and vice versa.

Other objects of the invention will become apparent upon reading the annexed detailed description in connection with the drawing in which:

Fig. 1 is a diagrammat'c view of a ram-jet aircraft engine with a control system embodying the invention;

Fig. 2 is a sectional view of the main fuel control apparatus of Fig. 1;

Fig. 3 is an enlarged sectional view of one of the auxiliary fuel nozzles of Fig. 1;

Fig. 4 is a sectional view of the fuel pressure regulator of Fig. 1; and

Fig. 5 is a diagrammatic view of a modified form of fuel pressure regulator.

Referring first to Fig. 1 of the drawing, a ram-jet engine 10 is schematically illustrated as comprising a duct-like housing member 12 having a rearwardly directed exhaust outlet nozzle 14 at its rear end. A centerbody member 16 is coaxially supported at the forward end of the duct-like member 12 by struts 18 to provide a forwardly directed annular air inlet 20. The engine 10 also includes a combustion chamber 22 within the duct-like member 12 between and in communication with the engine air inlet 20 and its exhaust nozzle 14. The combustion chamber 22 is provided with flame holder apparatus schematically indicated at 24 for stabilizing combustion within the combustion chamber 22. At least a portion of the fuel supplied to the combustion chamber 22 is supplied by fuel nozzles 25 and this fuel flow is automatically regulated as hereinafter described to prevent buzz of the inlet. As illustrated, the main fuel supply to the combustion chamber 22 is through fuel nozzles 26.

The main fuel nozzles 26 are supplied with fuel from the inlet 27 of a pump 28 via the pump outlet passage 30, a main fuel control apparatus 32 and a passage 34. The pump 28 is of the non-positive displacement type and, for example, may be a centrifugal pump. The pump 28 is drivably connected to an air turbine 36 by means indicated at 38. The air turbine 36 is driven by air supplied under pressure by an air scoop 40, from a point downstream of the inlet shock wave, hereinafter referred to, said scoop extracting air from the inlet passage 20. The air thus used to drive the turbine 36 may be discharged into the surrounding atmosphere through one or more of the struts 18 as indicated by the air discharge passage 41.

The main fuel control apparatus 32 preferably is similar to that fully disclosed in copending application Serial No. 286,364 filed May 6, 1952, now Patent No. 2,766,579. Such fuel control apparatus is herein schematically illustrated in Fig. 2. As shown in Fig. 2 the fuel control apparatus 32 includes a main valve 36 and an auxiliary valve 38 serially disposed downstream of said main valve. The main valve 36 is supported by and is urged in a closing direction by an elastically flexible bellows 40, the interior of which communicates with the upstream side of the main valve 36 through a restricted passage 42. A nozzle 44 communicates with the interior of the bellows 40 via a passage 46 whereby a small quantity of fuel flows through the restriction 42 and discharges into the fuel passage through the nozzle 44 downstream of the auxiliary valve 38. One end of a lever 48 overlies the discharge end of the nozzle 44 to function as a baffle member for said nozzle. A spring 50 is disposed between the lever 48 and the auxiliary valve 38 so as to urge the lever in a nozzle closing direction and to urge the valve 38 in a closing direction against the fuel pressure differential across said valve. The force of the spring 50 on the lever 48 is opposed by a second force transmitted thereagainst by a pin 54 from a lever 56 and bellows 58. The bellows 58 is disposed in a closed chamber 60, which, through a passage 62 and impact pressure tube 64, is subjected to a pressure proportional to the impact pressure of the surrounding air relative to the engine 10.

With this construction of the fuel control apparatus 32, if, for example, the pressure in the chamber 60 acting against the bellows 58 increases the lever 48 moves away from the nozzle 44 to increase the leakage fuel flow therethrough. This increase in fuel flow through the nozzle 44 increases the fuel pressure drop across the restriction 42 thereby increasing the valve opening force acting on the main valve 36 against the elasticity of the bellows 40. The main valve 36 thereupon opens to increase the fuel flow until the resulting increase in the fuel pressure differential on the auxiliary valve 38 is such that the increase in the force exerted by said control valve 38 on the lever 48 through the spring 50 rebalances the forces on the lever 48. In this way, as more fully explained in said copending application, the apparatus 32 regulates the fuel flow therethrough in proportion to the magnitude of the pressure in the chamber 60. The pressure in the chamber 60 is proportional to the impact pressure of the surrounding atmosphere relative to the engine 10. As also explained in said copending application, in at least a limited supersonic speed range this impact pressure is a measure of the mass air flow into the engine whereby the fuel supplied to the combustion chamber 22 by the fuel nozzles 26 is proportional to the mass air flow into said chamber.

Aircraft ram jet engines are designed for flight at supersonic speeds whereupon air enters the ram-jet inlet at supersonic velocity and a normal shock wave occurs in the inlet, said normal shock wave marking the transition from supersonic inlet air flow upstream of the shock wave to subsonic air flow downstream of said shock wave. In Fig. 1, the inlet normal shock wave is indicated by the line 70. During stable operation, the inlet shock wave 70 is disposed at the inlet throat or downstream therefrom. The inlet may be designed so that the inlet throat is at the inlet entrance or at a point, such as 71, downstream of the inlet entrance. For various reasons the velocity across a supersonic air inlet, such as the inlet 20, will not be entirely uniform across the inlet. For example the frictional drag of the inlet walls produces a slower moving boundary layer of air along said walls. Because of this non-uniform velocity distribution across the inlet 20, the inlet normal shock wave, instead of being sharply defined, occurs over a region and the line 70 has been drawn as a zig-zag line to represent the mean position of this normal shock region.

As previously stated at least a portion of the fuel burned in the combustion chamber 22 is supplied through fuel nozzles 25. As will be apparent, however, the fuel nozzles 26 and fuel control apparatus 32 may be dispensed with in which case the entire fuel supply to the engine combustion chamber would be supplied through the fuel nozzles 25. The fuel nozzles 25 are spaced along and around the inlet 20 such that approximately half of said nozzles are disposed upstream of the desired mean position of the inlet normal shock wave 70 and the other half are disposed downstream of said position. With the inlet throat disposed at 71 downstream of the inlet entrance, preferably at least some of the nozzles 25 are disposed upstream of the inlet throat. The fuel nozzles 25 may be disposed in a plurality of axially-spaced sets with each of said sets comprising a plurality of circumferentially-spaced nozzles disposed in a plane transverse to the engine axis.

The details of each fuel nozzle 25 are shown in Fig. 3. As illustrated in Fig. 3 each fuel nozzle 25 includes a pressure responsive ball valve 74 urged in a closing direction by a light spring 76. Each fuel nozzle valve 74 is arranged so that the pressure on the discharge side of said valve together with the valve spring 76 urges the valve in a closing direction against the pressure of the fuel supplied to said nozzle valve. The fuel nozzles 25 are supplied with fuel from the pump 28 via the pump outlet passage 30, a passage 78, a pressure regulator 80, a passage 82, a fuel manifold 84 and thence through a plurality of individual nozzle passages 86 to the fuel nozzles 25. The fuel discharging from a nozzle 25 mixes with the inlet air and is carried by said air into the combustion chamber 22.

The pressure of the fuel supplied to the fuel manifold 84 is controlled by the pressure regulator 80 in such a manner that said fuel pressure is sufficient to open the valves of those fuel nozzles discharging into the air inlet passage 20 upstream of the shock wave 70 but said fuel pressure is not sufficient to open the valves of those fuel nozzles discharging into the appreciably higher pressure region of the inlet passage 20 on the downstream side of the shock wave 70.

As illustrated in Fig. 4, the fuel regulator 80 includes a fuel valve 90 connected to one end of a lever 92. The other end of the lever 92 is connected to a bellows 94. The outside of the bellows 94 is subjected to the fuel pressure on the downstream side of the fuel valve 90 and the inside of said bellows is connected to a one end of passage 96 the other end 98 of which is subjected to substantially the static pressure of the air inlet 20 on the upstream side of the shock wave 70.

The pressure regulator 80 acts as a pressure reducing valve to automatically control the fuel valve 90 so that its output fuel pressure is greater than the fluid pressure within its bellows 94 such that the turning moment on the lever 92 exerted through said bellows 94 by this pressure difference balances the turning moment on said lever by the fuel pressure differential across the valve 90. Thus, since the pressure in the bellows 94 is substantially equal to the static inlet pressure upstream of the shock wave 70, the regulator 80 automatically operates to keep its output fuel pressure at a value greater than the static inlet pressure ahead of the shock wave. By proper selection of the effective areas of the valve 90 and bellows 94 and of the lengths of the moment arms of the forces acting on the lever 90, the output fuel pressure of the regulator is maintained sufficiently greater than the static inlet pressure upstream of the inlet shock wave 70 so as to open the valve 74 of each fuel nozzle 25 discharging into the inlet upstream of said shock wave.

The inlet static pressure upstream and downstream of the shock wave 70 both increase with increase in the flight speed Mach No. and decrease with increase in altitude. Accordingly the effective areas of the valve 90 and bellows 94 and the lengths of the moment arms of the forces acting on the lever 92 can also be and are selected so that the output fuel pressure of the regulator 80 not only is maintained above the inlet static pressure upstream of the shock wave 70 but also is maintained below the higher inlet static pressure downstream of said inlet shock wave. With this arrangement the valves 74 of those fuel nozzles 25 discharging into the inlet downstream of the inlet shock wave 70 are closed by the high inlet pressure downstream of said shock wave. Consequently the output fuel pressure of the regulator 80 is sufficiently large to open the valves 74 of those fuel nozzles 25 discharging into the inlet upstream of the inlet shock wave 70 but not so large as to open the valves 74 of those fuel nozzles discharging against the higher inlet pressure downstream of said inlet shock wave. At this point it should be noted that although, with the pump 28 being driven by the air turbine 36, the output fuel pressure of the pump 28 also increases with increase in flight speed and decreases with increase in altitude nevertheless the regulator 80 can be made to control the fuel pressure to the nozzles 25 to control the nozzle valves 74 as described even though the output fuel pressure of the pump 28 were maintained constant.

From what has been said, the function of the regulator 80 is to keep the fuel pressure supplied to the fuel nozzles 25 intermediate the inlet static pressures upstream and downstream of the inlet normal shock wave 70 so that the valves of those fuel nozzles 25 downstream of said shock wave 70 automatically close and fuel is discharged only through those fuel nozzles 25 upstream of the shock wave 70. In this way if the shock wave 70 moves in an upstream direction more of the fuel nozzles 25 close thereby decreasing the total fuel supply to the engine combustion chamber 22. Likewise if the shock wave 70 moves in a downstream direction more of the fuel nozzles 25 open to discharge fuel into the air inlet thereby increasing the fuel supply to the combustion chamber 22.

As previously stated the position of the shock wave 70 in the inlet depends on the static pressure on its downstream side in that said wave moves in an upstream or downstream direction in response to an increase or decrease, respectively, in the pressure on its downstream side. Furthermore any increase in the rate of fuel supply to the engine combustion chamber 22 at a given mass airflow into the engine results in an increase in the temperature of the engine exhaust gases thereby increasing the resistance to their flow through the engine at a given mass airflow into the engine nozzle 14 which in turn causes an increase in the pressure on the downstream side of the shock wave 70. Similarly a decrease in the rate of fuel supply to the engine results in a decrease in the pressure on the downstream side of the shock wave 70.

The system disclosed operates as follows to control automatically the position of the inlet normal shock wave 70. If, during flight, the pressure downstream of the shock wave 70 should increase for any cause, for example because of an air gust or a temporary increase in the rate of fuel supply, the shock wave 70 will move in an upstream direction. As said shock wave moves upstream past a nozzle 25 the higher pressure on the downstream side of said shock wave will close the valve 74 of said nozzle thereby decreasing the rate of fuel supply to the engine combustion chamber 22. By itself a decrease in said fuel supply decreases the pressure on the downstream side of the shock wave 70. Likewise if the pressure downstream of the inlet shock wave 70 decreases said wave moves in a downstream direction. As the wave 70 moves downstream past a nozzle 25 the lower pressure on the upstream side of said wave will result in the valve 74 of said nozzle opening thereby increasing the fuel supply to the engine combustion chamber, this fuel increase tending to increase the pressure on the downstream side of the shock wave. In this way movements of the inlet shock wave in response to a change in the pressure on its downstream side automatically produces a change in the rate of fuel supply in a direction opposing said pressure change. Consequently the control of the fuel supply by movements of the inlet shock wave is such as to minimize said shock wave movements. Since the main fuel control apparatus 32 maintains a constant fuel-air ratio of its fuel flow to the mass airflow into the engine, as is fully disclosed in said copending application, an increase in the fuel supply rate through said nozzles 25 results in an increase in the engine fuel-air ratio while a decrease in the fuel supply rate results in a decrease in the engine fuel-air ratio. Hence, at a given position of the normal shock, the fuel-air ratio is substantially constant, said engine fuel-air ratio increasing as said shock moves downstream and decreasing as said shock moves upstream. With this arrangement it is possible to operate a given ram-jet engine at a higher pressure recovery than would otherwise be possible without the danger that a gust, a temporary increase in the fuel supply, or some other condition would case the shock wave 70 to move completely out of the inlet to cause aerodynamic buzz of the inlet. Even if the inlet should buzz for some reason the rapidly oscillating inlet shock wave results in each fuel nozzle valve 74 responding to the average pressure on its discharge side whereupon at least some of the fuel valves 74 will close to reduce the fuel supply and restore aerodynamic stability of the inlet.

The pressure difference across the shock wave 70 is appreciable so that the regulator need not provide any precise control of its output pressure, it being sufficient that the output fuel pressure of the regulator be somewhere between the pressure on the upstream side of the shock wave 70 and the pressure on its downstream side. The magnitude of the pressure difference can be seen from the following example for a particular ram-jet engine. At an altitude of 40,000 feet and at a flight speed of Mach No. 2.75 the absolute static inlet pressure downstream of the shock wave 70, in inches of mercury, is approximately eighty (80) and upstream of the shock wave the inlet static pressure is approximately ten (10), said upstream inlet pressure being higher than that of the surrounding atmosphere because of precompression of the air entering the inlet. Furthermore, as previously stated, not only do the inlet static pressures upstream and downstream of the inlet shock wave 70 both increase with increase in the flight speed Mach No. and decrease with increase in altitude the output fuel pressure of the pump 28 also increases with increase of the flight speed Mach No. and decreases with increase of altitude. Particuarly because of this generally similar variation of the inlet static pressures upstream and downstream of the inlet shock wave 70 and of the pump output fuel pressure and because of the magnitude of the difference between said inlet static pressures, the regulator 80 is not limited to the structure disclosed. For example, for a particular engine the output fuel pressure of the pump 28 is such that approximately one-twentieth ($\frac{1}{20}$), of said pump output pressure is between the inlet static pressures upstream and downstream of the shock wave 70 throughout the flight regime of the engine. For example at a flight speed of Mach No. 2.75 at an altitude of 40,000 feet the output pressure of the pump 28 is approximately 675 inches of mercury, $\frac{1}{20}$ of this value being between the aforementioned upstream and downstream inlet pressures of 10 and 80 inches of mercury. Hence, at least for this particular engine, the pressure regulator 80 could comprise a pressure reducing valve providing an output fuel pressure equal to approximately $\frac{1}{20}$ of its input fuel pressure. Such a pressure reducing valve is schematically illustrated in Fig. 5.

Fig. 5 discloses a fuel passage 110 having a valve 112 which corresponds to the valve 90 of Fig. 4 so that the valve 112 controls the fuel pressure at the fuel nozzle valves 74. As schematically illustrated, the valve 112 is a balanced slide valve in that the pressure of the fuel controlled by said valve exerts little or no force tending to open or close said valve. The valve 112 is operatively connected to a lever 114 and a pair of bellows 116 and 118 act against said lever to control the position of the valve 112. The bellows 116 is subjected to the fuel pressure upstream of the valve 112 and urges the lever 114 in a valve opening direction and the bellows 118 is subjected to the fuel pressure downstream of said valve and urges the lever 114 in a valve closing direction. In order to eliminate the effect of ambient pressure, the bellows 116 is opposed by a sealed bellows 120 of equal area and the bellows 118 is similarly opposed by a sealed bellows 122. With this arrangement and assuming the bellows 116 and 118 to be of equal area the lever automatically positions the valve 112 so that ratio of the pressures across the valve 112 is equal to the ratio of the moment arms of the bellows 116 and 118.

The invention has been described in connection with a ram-jet engine but obviously is applicable generally to jet engines which take in air for combustion from the surrounding atmosphere and are designed for flight at supersonic speeds. For example the invention can be similarly applied to a turbo-jet engine so that fuel is introduced into the inlet of the turbo-jet engine under control of the pressures upstream and downstream of the inlet shock wave in the manner illustrated in Fig. 1. Thus the air inlet 20 and combustion chamber 22 of Fig. 1 could comprise the air inlet and combustion chamber of a turbo-jet engine.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. Control apparatus for an aircraft jet engine having a combustion chamber and having an air inlet for supplying air from the surrounding atmosphere, said inlet being arranged for supersonic entering air flow with the resulting shock wave marking the transition from supersonic flow to subsonic flow positioned within the inlet; said apparatus comprising mechanism for regulating the supply of fuel to said engine combustion chamber, said mechanism including means for measuring fuel and air flow to said chamber and regulating fuel flow in response thereto to maintain a predetermined fuel-air ratio, said mechanism also including means responsive to a predetermined increase in the static pressure, at least at one point within said inlet, resulting from upstream movement of said shock wave for decreasing the rate of fuel supply to said chamber so as to decrease said fuel-air ratio.

2. In combination with a jet engine having a combustion chamber and having a forwardly directed air inlet passage through which air enters for combustion within said chamber; a plurality of fuel passages for supplying fuel to said combustion chamber and having their discharge ends opening into said air inlet passage at points spaced therealong in the direction of the inlet air flow; and means responsive to an increase in the static pressure within said inlet above a predetermined value at the discharge ends of each of said passages for decreasing the rate of fuel flow therethrough.

3. In combination with a jet engine having a combustion chamber and having a forwardly directed air inlet, said inlet being arranged for supersonic entering air flow with the resulting normal shock wave positioned within said inlet; a plurality of fuel passages for supplying fuel to said combustion chamber and having their discharge ends opening into said air inlet passage at points spaced therealong in the direction of the inlet air flow; and means responsive to an increase in the static pressure within said inlet at the discharge ends of each of said passages resulting from movement of said shock wave in an upstream direction for decreasing the rate of fuel flow therethrough.

4. In combination with a jet engine having a combustion chamber and having a forwardly directed air inlet passage through which air enters for combustion within said chamber; a plurality of fuel passages for supplying fuel to said combustion chamber and having their discharge ends opening into said air inlet passage at points spaced therealong in the direction of the inlet air flow; and a pressure responsive valve for each of said passages for varying the fuel flow through its associated passage in response to changes in the inlet static pressure at the discharge end of said passage.

5. In combination with a jet engine having a combustion chamber and having a forwardly directed air inlet passage through which air enters for combustion within said chamber; a plurality of fuel passages for supplying fuel to said combustion chamber and having their discharge ends opening into said air inlet passage at points spaced therealong in the direction of the inlet air flow; and a pressure responsive valve for each of said passages, each of said valves being arranged to close its associated passage in response to the inlet static pressure at the discharge end of said passage exceeding a predetermined value.

6. In combination with a jet engine having a combustion chamber and having a forwardly directed air inlet through which air enters for combustion within said chamber, said inlet being arranged for supersonic entering air flow with the resulting normal shock wave positioned within said inlet; a plurality of fuel passages for supplying fuel to said chamber and having their discharge ends opening into said inlet at points spaced therealong in the direction of the inlet air flow, at least some of said passages having their discharge ends opening into said inlet downstream of the mean position of said shock wave within the inlet and at least other said passages having their discharge ends opening into said inlet upstream of said shock wave position; and a pressure responsive valve for each of said passages, each of said valves being arranged to close its associated passage in response to movement of said shock wave from a position downstream of the discharge end of said passage to a position upstream of the discharge end of said passage.

7. In combination with a jet engine having a combustion chamber and having a forwardly directed air inlet through which air enters for combustion within said chamber, said inlet being arranged for supersonic entering air flow with the resulting normal shock wave positioned within said inlet; a plurality of fuel passages for supplying fuel to said chamber and having their discharge ends opening into said inlet at points spaced therealong in the direction of the inlet air flow; a valve for each of said fuel passages, each of said valves being urged in an opening direction by the fuel pressure on its fuel inlet side and being urged in a closing direction by the fuel pressure on its fuel discharge side; and means for automatically regulating the pressure of the fuel supplied to said valves such that said pressure is less than the static inlet pressure downstream of said shock wave and is greater than the static inlet pressure upstream of said shock wave.

8. In combination with a jet engine having a combustion chamber with a forwardly directed air inlet for supersonic entering air flow with the shock wave marking the transition from supersonic to subsonic flow disposed within said inlet; first and second passages for supplying fuel to said chamber for combustion therein; means responsive to a condition indicative of the mass air flow through said inlet for regulating the rate of fuel flow through said first passage means; and means responsive to a predetermined increase in the static pressure at a particular point within said inlet resulting from upstream movement of said shock wave for decreasing the rate of fuel supply through said second passage independently of the flow through said first passage.

9. In combination with a jet engine having a combustion chamber and having a forwardly directed air inlet passage through which air enters for combustion within said chamber; first passage means for supplying fuel to said chamber; means for automatically regulating the rate of fuel supply through said first passage means; a plurality of second passages for supplying fuel to said combustion chamber independently of said first passage means, said second passages having their discharge ends opening into said air inlet passage at points spaced therealong in the direction of the inlet air flow; and means responsive to a predetermined increase in the static pressure within said inlet at the discharge end of each of said second passages for decreasing the rate of fuel flow therethrough.

10. In combination with a jet engine having a combustion chamber and having a forwardly directed air inlet through which air enters for combustion within said chamber, said inlet being arranged for supersonic entering air flow with the resulting normal shock wave positioned within said inlet; first passage means for supplying fuel to said chamber; means for automatically regulating the rate of fuel flow through said first passage means in response to changes in the impact pressure of the surrounding air relative to the engine; a plurality of second passages for supplying fuel to said chamber independently of said first passage means, said second passages having their discharge ends opening into said inlet at points spaced therealong in the direction of the inlet air flow with at least some of said passages having their discharge ends disposed downstream of the mean position of said shock wave and at least other of said passages having their discharge ends disposed upstream of said shock wave; and a pressure responsive valve for each of said passages with each of said valves being arranged to close its associated passage in response to movement of said shock wave from a position downstream of the discharge end of said passage to a position upstream of the discharge end of said passage.

11. Control apparatus for an aircraft jet engine having a combustion chamber and having an air inlet for supplying air from the surrounding atmosphere, said inlet being arranged for supersonic entering air flow with the resulting shock wave marking the transition from supersonic flow to subsonic flow positioned within the inlet; said apparatus comprising mechanism for regulating the supply of fuel to said engine combustion chamber, said mechanism including means for measuring fuel and air flow to said chamber and regulating fuel flow in response thereto to maintain a predetermined fuel-air ratio, said mechanism also including means responsive to downstream and upstream movements of said shock wave for increasing and decreasing respectively said fuel-air ratio.

References Cited in the file of this patent

UNITED STATES PATENTS

| | | |
|---|---|---|
| 2,540,594 | Price | Feb. 6, 1951 |
| 2,654,995 | Ostroff | Oct. 13, 1953 |
| 2,739,444 | Chamberlain | Mar. 27, 1956 |
| 2,766,579 | Gallo et al. | Oct. 16, 1956 |
| 2,796,730 | Lawrence | June 25, 1957 |